United States Patent [19]

Caskey et al.

[11] Patent Number: 4,961,760
[45] Date of Patent: Oct. 9, 1990

[54] HOLLOW FIBER MEMBRANE FLUID SEPARATION DEVICE ADAPTED FOR BORESIDE FEED

[75] Inventors: Terrence L. Caskey, Concord; Janine L. Jorgensen, Clayton; Johnny L. Trimmer, Antioch, all of Calif.

[73] Assignee: The Dow Chemical Company, Midland, Mich.

[21] Appl. No.: 429,928

[22] Filed: Oct. 30, 1989

Related U.S. Application Data

[63] Continuation-in-part of Ser. No. 309,756, Feb. 9, 1989, Pat. No. 4,929,259.

[51] Int. Cl.$^5$ .................. B01D 53/22; B01D 71/50
[52] U.S. Cl. .................. 35/158; 210/321.81; 210/321.9; 210/500.23
[58] Field of Search .................. 55/16, 68, 158; 210/321.79, 321.8, 321.81, 321.88, 321.89, 321.9, 500.23

[56] References Cited

U.S. PATENT DOCUMENTS

| | | | |
|---|---|---|---|
| 3,339,341 | 9/1967 | Maxwell | 55/16 |
| 3,422,008 | 1/1969 | McLain | 55/158 X |
| 3,616,928 | 11/1971 | Rosenblatt | 55/158 X |
| 3,698,560 | 10/1972 | Tapp et al. | 210/450 X |
| 3,832,830 | 9/1974 | Gerow | 55/158 |
| 4,031,012 | 6/1977 | Gics | 55/158 X |
| 4,061,574 | 12/1977 | Clark | 55/158 X |
| 4,179,380 | 12/1979 | Amicel et al. | 55/158 X |
| 4,220,535 | 9/1980 | Leonard | 55/158 X |
| 4,231,879 | 11/1980 | Spranger | 210/321.81 |
| 4,235,983 | 11/1980 | Steigelmann et al. | 55/16 X |
| 4,237,596 | 12/1980 | Hughes et al. | 55/158 X |
| 4,268,279 | 5/1981 | Shindo et al. | 55/16 |
| 4,352,736 | 11/1982 | Ukai et al. | 55/158 X |
| 4,367,139 | 1/1983 | Graham | 210/456 X |
| 4,380,460 | 4/1983 | Otstot et al. | 55/158 |
| 4,508,548 | 4/1985 | Manatt | 55/16 X |
| 4,517,720 | 5/1985 | Otstot et al. | 55/16 X |
| 4,556,180 | 12/1985 | Manatt | 55/158 X |
| 4,565,630 | 1/1986 | Runkle | 210/323.2 X |
| 4,578,190 | 3/1986 | Fowler | 210/323.2 X |
| 4,666,469 | 5/1987 | Krueger et al. | 55/16 |
| 4,689,255 | 8/1987 | Smoot et al. | 55/16 X |
| 4,707,267 | 11/1987 | Johnson | 55/16 X |
| 4,718,921 | 1/1988 | Makino et al. | 55/16 |
| 4,720,348 | 1/1988 | Savins | 252/8.554 |
| 4,734,106 | 3/1988 | Gollan | 55/16 |
| 4,746,430 | 5/1988 | Cooley | 210/321.85 |
| 4,752,305 | 6/1988 | Johnson | 55/16 |
| 4,758,341 | 7/1988 | Banner | 55/158 X |
| 4,770,778 | 9/1988 | Yokoyama et al. | 210/321.79 |
| 4,781,834 | 11/1988 | Sekino et al. | 210/321.88 |
| 4,871,379 | 10/1989 | Edwards | 55/16 X |

FOREIGN PATENT DOCUMENTS

| | | |
|---|---|---|
| 226431 | 6/1987 | European Pat. Off. |
| 3409000 | 9/1984 | Fed. Rep. of Germany |
| 54-152681 | 5/1978 | Japan |
| 53-31828 | 9/1978 | Japan |
| 58-143805 | 2/1982 | Japan |
| 61-011110 | 6/1984 | Japan |
| 61-119273 | 6/1986 | Japan |
| 2198430 | 6/1988 | United Kingdom |

OTHER PUBLICATIONS

Antonson et al., "Analysis of Gas Separation by Permeation in Hollow Fibers," *Ind. Eng. Chem., Process Des. Dev.*, vol. 16, No. 4, 1977, pp. 463–469.

*Primary Examiner*—Robert Spitzer

[57] ABSTRACT

The invention is a hollow fiber membrane fluid separation device specially adapted for boreside feed.

24 Claims, 3 Drawing Sheets

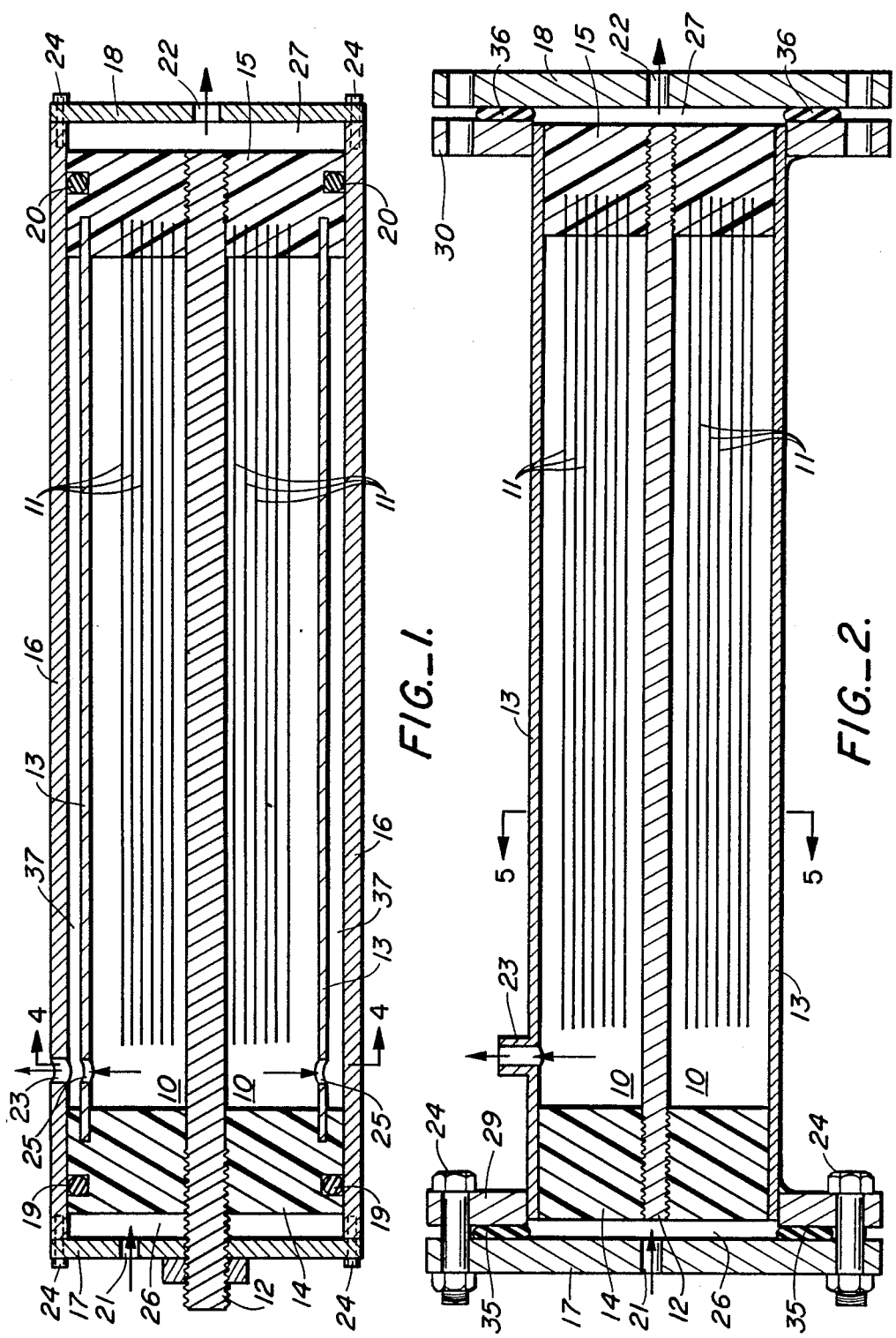

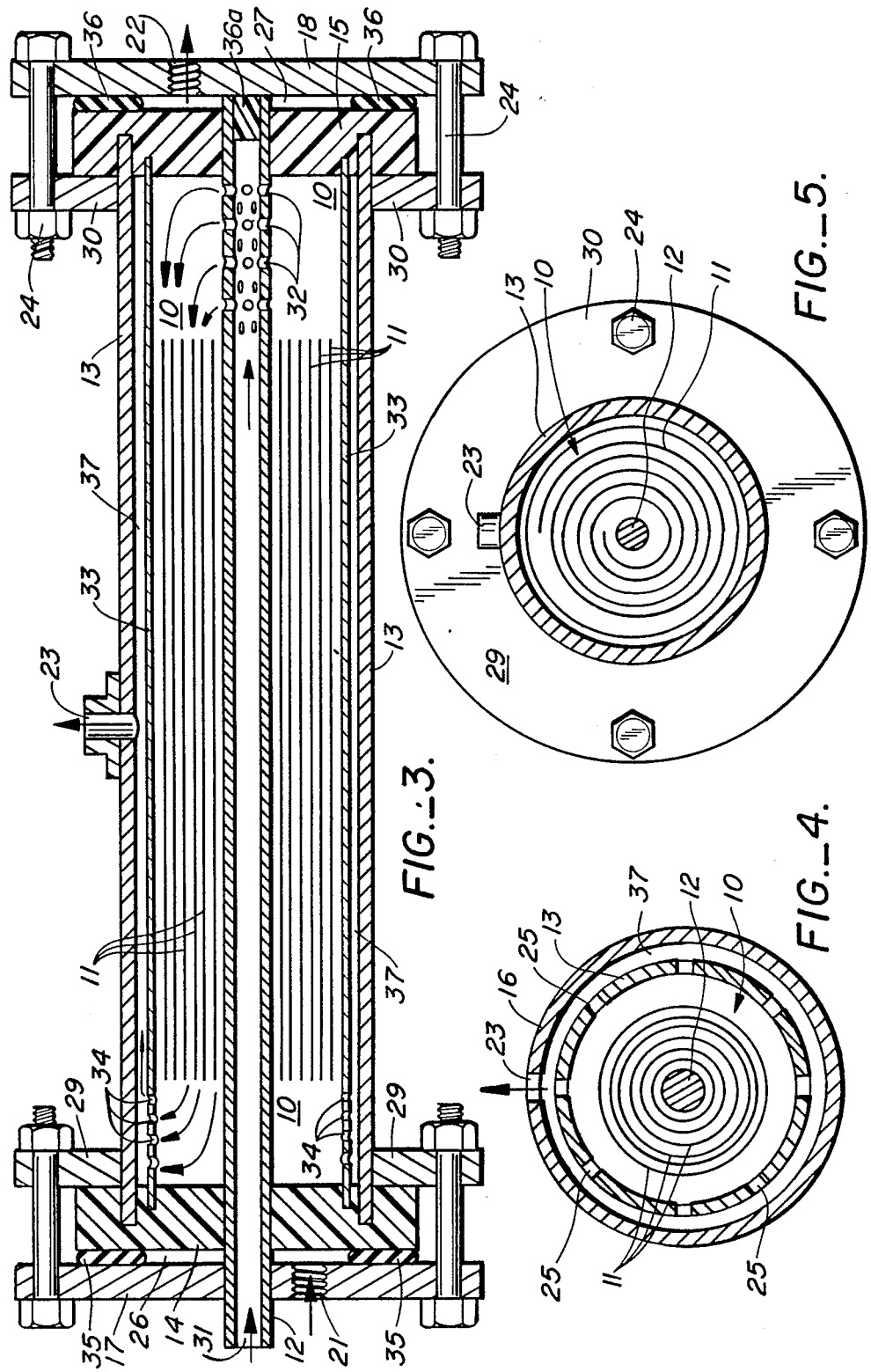

U.S. Patent    Oct. 9, 1990    Sheet 3 of 3    4,961,760
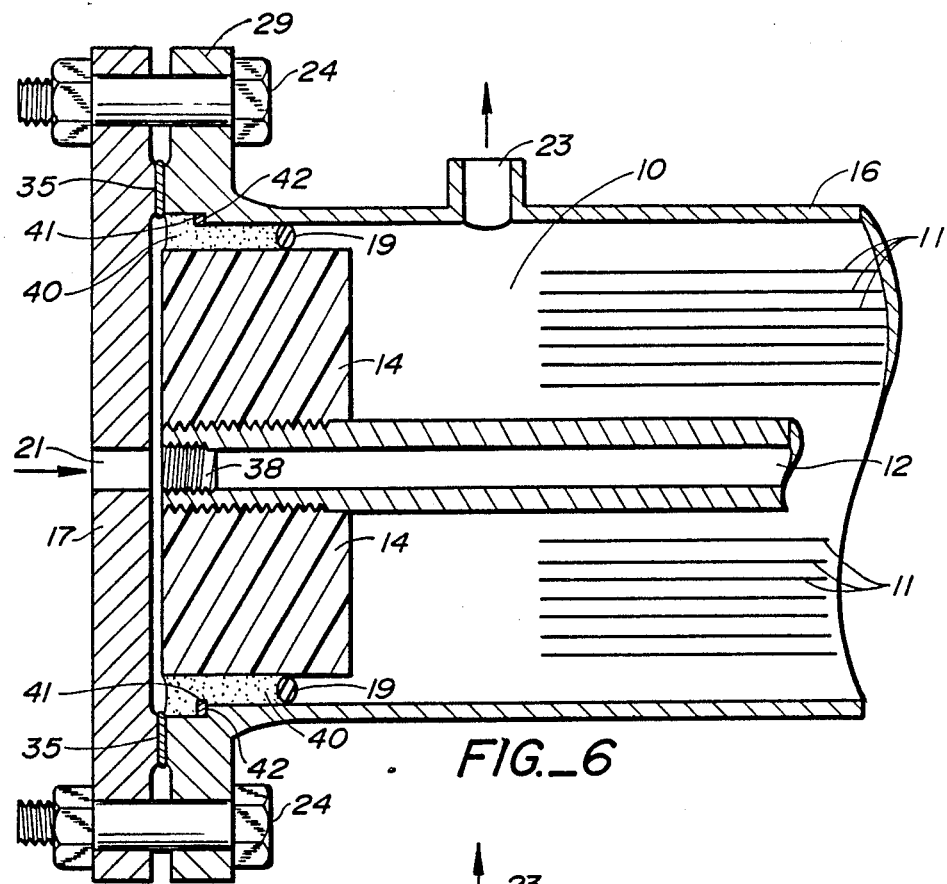
FIG._6
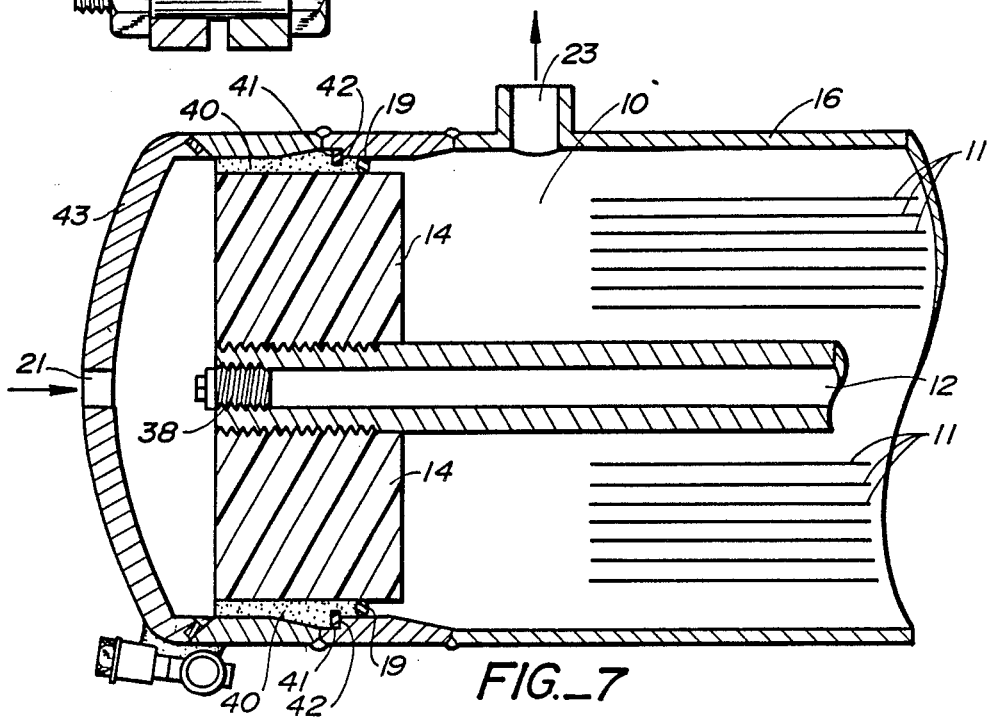
FIG._7

HOLLOW FIBER MEMBRANE FLUID SEPARATION DEVICE ADAPTED FOR BORESIDE FEED

CROSS REFERENCE TO RELATED CO-PENDING APPLICATION

This Application is a continuation-in-part of U.S. patent application Ser. No. 309,756, filed Feb. 9, 1989, now U.S. Pat. No. 4,929,759.

BACKGROUND OF INVENTION

This invention relates to a hollow fiber membrane fluid separation device which is specially adapted for boreside feed of a fluid mixture to be separated.

Hollow fiber membrane devices commonly contain two or three regions, wherein such regions are sealingly engaged or otherwise maintained separate and distinct so that fluid cannot communicate from one region to the other, except by passing the fluid through the bores of the hollow fibers or by permeating the fluid across the walls of the hollow fibers. Generally, a hollow fiber membrane device comprises a bundle of hollow fibers arranged in a fashion such that each end of the hollow fibers are embedded in a resin matrix commonly referred to as a tubesheet or header. Such hollow fibers communicate through the tubesheets and are open on the opposite face of each tubesheet. The opposite face of the tubesheet as used herein means the face of the tubesheet which is opposite the bundle. Generally, the regions of a hollow fiber membrane separation device are divided by the tubesheets and seals about the tubesheets. In a shellside feed process, the region about the outside of the hollow fiber bundle between the tubesheets is pressurized. The fluids to be separated are introduced into the device in the region between the tubesheets and the outside of the fibers, that is, the shellside, and the fluids which permeate through the hollow fiber membranes into the bores of the hollow fibers are removed at one or both ends of the hollow fibers in the region(s) adjacent to the opposite face of one or both tubesheets. The non-permeating fluids are removed from a region in the area between the tubesheets and the outside of the fibers. Most commercial industrial fluid separation membrane devices and processes operate in this fashion.

In a boreside feed process, the mixture of fluids to be separated is introduced into one end of the hollow fiber membrane device adjacent to the opposite face of the first tubesheet such that the fluid mixture flows down the bores of the hollow fibers through the first tubesheet and into the portion of the hollow fibers contained in the region between the tubesheets. In the region between the tubesheets, the fluids which selectively permeate through the hollow fiber membranes are removed from the shellside of the device on the outside of the hollow fibers. The fluids which do not permeate through the hollow fiber membranes exit into a region adjacent to the opposite face of the second tubesheet and are removed from that region. In such a boreside feed operation, pressure is exerted on the faces of the tubesheets which are opposite the fiber bundle. The bores of the hollow fibers are also pressurized in such an operation. As the tubesheets are usually comprised of a resinous material, significant bending, compressive, and sheer stresses are exerted on the tubesheets by such a boreside feed operation. Such stresses exerted on the tubesheets create a problem with respect to supporting the tubesheets and preventing the tubesheets from collapsing in on the hollow fiber bundle.

A second problem associated with boreside feed is obtaining adequate flow distribution of the permeate on the shellside of the hollow fiber membrane device so that efficient separation can be achieved. One of the driving forces for transport through the membrane is the concentration gradient across the membrane. As the fluid mixture to be separated flows down the bore of the hollow fibers and the selectively permeable fluids permeate through the hollow fibers, the concentration of the selectively permeable fluids inside the hollow fibers is reduced and the concentration of the selectively permeable fluids on the shellside (outside) of the hollow fibers increases. This results in a decrease of the concentration driving force across the membrane which lowers separation performance.

A third problem associated with boreside feed is that if the flow on the shellside of the hollow fiber membranes is not properly controlled, the shellside of the hollow fiber membrane device will contain localized areas of high concentration of the permeate fluid which impedes efficient flow of permeate to the exit ports.

What is needed is a hollow fiber membrane fluid separation device which is adapted for boreside feed. What is further needed is such a membrane device which minimizes the stresses on the tubesheets. What is further needed is such a membrane device in which the flow of the permeate on the shellside of the device is controlled to maximize the concentration gradients along the hollow fibers and to prevent localized areas of high permeate concentration, thus enhancing the flow of permeate on the shellside of the device.

SUMMARY OF INVENTION

The invention is a hollow fiber membrane fluid separation device comprising:

A. a plurality of hollow fiber membranes, wherein the hollow fiber membranes are arranged in a bundle and are adapted for the separation of one or more fluids from one or more other fluids in a feed fluid mixture:

B. a first tubesheet comprised of a thermoset or thermoplastic polymeric material located at the first end of the bundle, arranged such that the hollow fiber membranes are embedded in the first tubesheet and communicate through the first tubesheet and are open on the opposite face of the first tubesheet:

C. a second tubesheet comprised of a thermoset or thermoplastic polymeric material located at the second end of the bundle opposite the first end of the bundle, arranged such that the hollow fiber membranes are embedded in the second tubesheet and communicate through the second tubesheet and are open on the opposite face of the second tubesheet:

D. a core about which is arranged the hollow fiber membrane bundle, further arranged such that the core extends through and is bonded to the first tubesheet and the second tubesheet:

E. a casing means encasing the hollow fiber membrane bundle, the first and second tubesheets, and the core;

F. a first end capping means arranged and adapted for sealing the first end of the casing means at the end of the casing means near the first tubesheet;

G. a first attachment means arranged for attaching the first end capping means to the first end of the casing means;

H. a feed inlet means adapted for introducing the feed fluid mixture to be separated into the bores of the hollow fiber membranes by contacting the feed fluid mixture with the open hollow fiber membranes at the opposite face of the first tubesheet;

I. a feed inlet region defined by the first end capping means and the casing means located adjacent to the opposite face of the first tubesheet, wherein the feed inlet region is sealed such that fluid can only enter or leave the feed inlet region through the feed inlet means or the hollow fiber membranes, and the feed inlet region is arranged to introduce the feed fluid mixture into the bores of the hollow fiber membranes;

J. a first means for forming a seal between the first tubesheet means and the casing means such that fluid cannot communicate between the feed inlet region and the region between the two tubesheets which is outside of the hollow fiber membranes;

K. a second end capping means arranged and adapted for sealing the second end of the casing means at the end of the casing means near the second tubesheet;

L. a second attachment means arranged for attaching the second end capping means to the second end of the casing means:

M. a non-permeate outlet means adapted for removing fluid which does not permeate through the hollow fiber membranes from the bores of the hollow fiber membranes at the opposite face of the second tubesheet;

N. a non-permeate outlet region defined by the second end capping means and the casing means located adjacent to the opposite face of the second tubesheet, wherein the non-permeate outlet region is sealed such that fluid which does not permeate the hollow fiber membranes can only enter or leave the non-permeate outlet region through the hollow fiber membranes or the non-permeate outlet means and the non-permeate outlet region is arranged to remove the fluid which does not permeate the hollow fiber membranes from the bores of the hollow fiber membranes:

O. a second means for forming a seal between the second tubesheet means and the casing means such that fluid cannot communicate between the non-permeate outlet region and the region between the two tubesheets which is outside of the hollow fiber membranes;

P. a permeate outlet means for removing fluid which permeates through the hollow fiber membranes from the region between the two tubesheets which is outside of the hollow fiber membranes: and Q. one or more means for channeling flow of fluid which permeates through the hollow fiber membranes to the region between the two tubesheets which is outside of the hollow fiber membranes, such means for channeling flow arranged to channel flow of fluid which permeates through the hollow fiber membranes in the longitudinal direction parallel to the core toward the permeate outlet means, wherein the means for channeling flow have one end embedded in or attached to the second tubesheet and the second end located at a distance from the first tubesheet, said distance between the second end of the means for channeling flow and the first tubesheet being sufficient to allow the fluid which permeates through the hollow fiber membranes and flows along the means for channeling flow to flow to the permeate outlet means.

These hollow fiber membrane separation devices provide for improved support of the resin tubesheets, thus reducing the bending and compression stresses on the tubesheets. The devices of this invention also demonstrate improved permeate flow and more efficient recovery of permeate and non-permeate fluids.

DESCRIPTION OF FIGURES

FIG. 1 demonstrates a schematic drawing of a preferred embodiment of the invention wherein the device is enclosed in a case.

FIG. 2 illustrates a schematic drawing of a preferred embodiment of the invention wherein the tubesheet support means also functions as the membrane case.

FIG. 3 represents a schematic drawing of a preferred embodiment of the invention wherein a sweep fluid is introduced into the hollow fiber bundle from the core.

FIG. 4 is a schematic drawing of a cross-sectional view of a preferred embodiment of the hollow fiber membrane device of the invention in which baffles are arranged in a concentric manner.

FIG. 5 illustrates a schematic drawing of a cross-sectional view of a preferred embodiment of the hollow fiber membrane device of the invention wherein baffles are arranged in a spiral fashion.

FIGS. 6 and 7 are schematic drawings of preferred embodiments of the invention which depict alternate end capping and sealing means.

DETAILED DESCRIPTION OF THE INVENTION

This invention relates to devices for separating one or more fluids from one or more other fluids in a fluid mixture in which the separation is performed by selectively transporting one or more fluids across a membrane. In this invention, the membranes are in hollow fiber form and the device is adapted for feeding the fluid mixture to be separated down the bores or lumens of the hollow fiber membranes. The bore or lumen as used herein refers to the portion of the fiber which is hollow in the center of such fiber.

The hollow fiber membrane devices of this invention can be used to separate one or more fluids from one or more other fluids in a fluid mixture wherein the fluids possess different transport rates through or across the membranes. The fluids may be in gas, vapor, or liquid state.

In one preferred embodiment, the hollow fiber membrane devices of this invention are useful in separating one or more gases from one or more other gases in a feed gas mixture. The mixture of gases to be separated preferably comprises at least one of the gases selected from the group consisting of hydrogen, helium, oxygen, nitrogen, carbon monoxide, carbon dioxide, hydrogen sulfide, ammonia, methane, other light hydrocarbons, and the like. Light hydrocarbons as used herein means saturated and unsaturated $C_{1-4}$ hydrocarbons. Examples of such gases being separated are hydrogen and/or helium from light hydrocarbons, oxygen from nitrogen, nitrogen from methane, carbon monoxide and/or carbon dioxide from light hydrocarbons, and the like.

In another preferred embodiment, the fluids to be separated are liquids. In one preferred embodiment wherein the fluids to be separated are liquids, the material is transported through or across the membrane as a gas or vapor. The material permeating through or across the membrane as a gas or vapor may be removed from the device as a gas or vapor or condensed and removed from the device as a liquid. This separation may be referred to as membrane stripping, membrane distillation, or pervaporation. In membrane stripping, a microporous membrane is used and the material permeating through or across the membrane is removed from the device as a gas or vapor. In membrane distillation, a microporous membrane is used and the material permeating through or across the membrane is condensed and removed from the device as a liquid. In pervaporation, a non-microporous membrane is used and the material permeating through or across the membrane may be removed as a gas or vapor or condensed and removed from the device as a liquid. In these embodiments, volatile compounds, that is, those with relatively higher vapor pressures under the separation conditions, are separated from compounds with relatively lower vapor pressures. Examples of volatile compounds which may be removed from liquid mixtures include $C_{1-10}$ aliphatic and aromatic halogenated hydrocarbons such as dichloromethane (methylene chloride), dibromomethane (methylene bromide), trichloromethane (chloroform), tribromomethane (bromoform), carbon tetrachloride, 1,1-dichloroethane, 1,2-dichloroethane, 1,1,1-trichloroethane, 1,1,2-trichloroethane, trichloroethylene, tetrachloroethylene (perchloroethylene), 1,2-dichloropropane, chlorobenzene, dichlorobenzene, trichlorobenzene, and hexachlorobenzene; $C_{1-10}$ aliphatic and aromatic hydrocarbons such as methane, ethane, propane, butane, hexane, heptane, octane, ethylene, propylene, butylene, benzene, toluene, and xylene; $C_{1-10}$ aliphatic and aromatic alcohols such as methanol, ethanol, propanol, butanol, pentanol, hexanol, and phenol; $C_{1-8}$ ketones such as acetone, methylethylketone, methylisobutylketone, pentanone, and hexanone: $C_{1-8}$ ethers such as bis(2-chloroethyl)ether: $C_{1-8}$ amines such as methylamine, dimethylamine, trimethylamine, ethylamine, diethylamine, triethylamine, ethylenediamine, and aniline; and the like. Less volatile liquids from which the volatile compounds may be removed include water and mixtures of water and organics. In another preferred embodiment, gases entrained or dissolved in a liquid may be removed from such liquids. Examples of such entrained or dissolved gases include oxygen, carbon monoxide, carbon dioxide, sulfur dioxide, hydrogen sulfide, ammonia, and the like.

The hollow fiber membranes are arranged in a bundle which comprises a plurality of the hollow fiber membranes. Such a bundle may take various shapes and possess various fiber wrapping patterns. Bundles of hollow fiber membranes useful in this invention may comprise various shapes and fiber arrangements, including those disclosed in Mahon, U.S. Pat. No. 3,228,876 and McLain, U.S. Pat. No. 3,422,008, the relevant portions of each patent incorporated herein by reference for all legal purposes which may be served thereby. Preferably the bundle is arranged in an organized, that is, substantially non-random, fashion. In one preferred embodiment, the hollow fiber membrane bundle is arranged in a cylindrical fashion with the ends of the hollow fibers located at each end of the cylindrical bundle. Such a bundle is preferably an elongated bundle with the length being greater than the diameter Preferably, the hollow fibers in the bundle are arranged in either a parallel wrap fashion or in a bias wrap fashion. In parallel wrapping, the hollow fibers lie substantially parallel to one another with each end of the hollow fibers found at each end of the bundle. In bias wrapping, the hollow fibers are wrapped in a crisscross pattern at a set angle, thus holding the hollow fibers in place in a bundle. In the bias wrap pattern, the ends of the hollow fibers are located at the end of the bundle. Permeable cloth wraps such as DYNEL polyester cloth may be used to help hold the bundles together.

The hollow fiber membranes are generally formed from a polymeric material which is capable of separating one or more fluids from one or more other fluids in a fluid mixture. The polymeric materials which may be used to prepare the hollow fiber membranes preferably include olefinic polymers, such as poly-4-methylpentene, polyethylene, and polypropylene: polytetrafluoroethylene; cellulosic esters, cellulose ethers, and regenerated cellulose; polyamides: polyetherketones and polyetheretherketones: polyestercarbonates; polycarbonates, including ring substituted versions of bisphenol based polycarbonates: polystyrenes; polysulfones; polyimides; polyethersulfone: and the like. The hollow fiber membranes may be homogeneous, symmetric (isotropic), asymmetric (anisotropic), or composite membranes. The membranes may have a dense discriminating region which separates one or more fluids from one or more other fluids based on differences in solubility and diffusivity of the fluids in the dense region of the membrane. Alternatively, the membranes may be microporous and separate one or more fluids from one or more other fluids based on relative volatilities of the fluids.

Hollow fiber membranes with dense regions are preferred for gas separations. Asymmetric hollow fiber membranes may have the discriminating region either on the outside of the hollow fiber, at the inside (lumen surface) of the hollow fiber, or located somewhere internal to both outside and inside hollow fiber membrane surfaces. In the embodiment where the discriminating region of the hollow fiber membrane is internal to both hollow fiber membrane surfaces, the inside (lumen) surface and the outside surface of the hollow fiber membrane are porous, yet the membrane demonstrates the ability to separate gases. In the embodiment wherein gases are separated, the preferred polymeric materials for membranes include polyestercarbonate, polysulfone, polyethersulfone, polyimide, and polycarbonate. More preferred polymeric materials for gas separation membranes include polycarbonate and polyestercarbonate. In one preferred embodiment, such membranes are prepared by the process described in U.S. Pat. No. 4,772,392, the relevant portions incorporated herein by reference for all legal purposes which may be served thereby.

Microporous membranes are preferred for liquid separations such as membrane stripping and membrane distillation. Such microporous membranes may be symmetric (isotropic) or asymmetric (anisotropic). In the embodiment wherein liquids are separated, preferred polymeric materials for membranes include polyolefins or fluorinated polyolefins, such as polyethylene, polypropylene, poly-4-methylpentene, fluorinated polyethylene, polytetrafluoroethylene, and copolymers and blends thereof, polystyrene, polyetherketone, and polyetheretherketone. The methods for preparing such hollow fiber membranes are well known in the art.

About each end of the bundle is a tubesheet. The tubesheet functions to hold the hollow fiber membranes in place and to separate the membrane device into three different regions. Such regions include the feed inlet region wherein the mixture of fluids to be separated is introduced into the hollow fiber membranes. The second region is the region between the tubesheets wherein a portion of the fluids fed down the bores of the hollow fiber membranes permeates across the hollow fiber membranes onto the shellside (outside) of the hollow fiber membranes. The third region is the non-permeate outlet region, into which the fluid flowing down the bores of the hollow fiber membranes which does not permeate across the membranes flows and from which Preferred epoxy resins are those resins derived from bisphenol A, e.g., diglycidyl ethers of bisphenol A. Such preferred resins generally correspond to the formula:

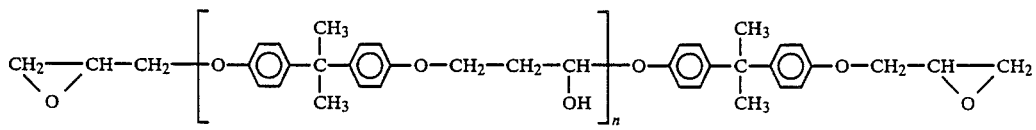

such fluid is removed. The tubesheets may be comprised of a thermoset or thermoplastic resinous material. Such resinous material should be capable of forming a fluid tight seal around the hollow fiber membranes. In some embodiments, it is preferable that such resinous material be capable of bonding to the core and/or case as well as the hollow fiber membranes. The hollow fiber membranes in the bundle communicate through each tubesheet, and the face of each tubesheet opposite the bundle is opened such that the bores of the hollow fiber membranes are opened to the region adjacent to each face, thereby allowing communication of fluid from such regions into and out of said hollow fiber membranes. The majority of each tubesheet comprises a composite of the hollow fiber membranes embedded in the resinous material. The tubesheets may be any shape which performs the functions hereinbefore described. Preferably, the tubesheets are circular with sufficient cross-sectional area and thickness to provide support for the hollow fiber membranes and to withstand the pressures exerted on the tubesheets during operation. The portion of each tubesheet outside of the bundle may be built up for various purposes depending upon the design of the device. These portions of the tubesheets may comprise solely resin or resin impregnated cloth which is wrapped around the outer portion of each tubesheet.

Examples of such materials useful as resinous materials for tubesheets include artificial and natural rubbers, phenolaldehydes, acrylic resins, polysiloxanes, polyurethanes, fluorocarbons, and epoxy resins.

In the embodiment where the device is used for gas separations, the tubesheets are preferably prepared from epoxy resins. Any epoxy resin which adheres to the hollow fiber membranes and provides stability to a hollow fiber membrane device once cured can be used in this invention. Polyepoxide resins which are desirable for the resin formulations useful in this invention include glycidyl polyethers of polyhydric phenols.

Illustrative of the polyhydric phenols are mononuclear phenols and polynuclear phenols, and included within the latter are the phenol-aldehyde condensation resins commonly known as novolac resins. Typical mononuclear phenols include resorcinol, catechol, hydroquinone, phloroglucinol and the like. Examples of polynuclear phenols include 2,2 bis(4-hydroxyphenyl)propane(bisphenol A), 4,4=-dihydroxybenzophenone, 1,1-bis(4-hydroxyphenyl)ethane, bis(2-hydroxynaphthyl)methane, 2,2-bis(4-hydroxyphenyl)butane, 4,4=-dihydroxyphenyl phenyl sulfone, and the like.

The preparation of such epoxy resins is well known and is described in a number of patents such as U.S. Pat. No. 2,935,488 and in textbooks such as Lee and Neville, *Handbook of Epoxy Resins*, McGraw-Hill Book Co., 1967, both incorporated herein by reference.

Wherein n is a positive real number of between about zero and 6, more preferably between about zero and 4, more preferably between about zero and 1.5. In the discussion hereinafter, all parts with respect to the resin formulations will be based on 100 parts by weight of the epoxy resin (parts per hundred parts of resin, phr).

Epoxy resins preferred for use in this invention include D.E.R. ® epoxy resins, available from the Dow Chemical Company.

The epoxy resin is cured with a curing agent known to those skilled in the art. Preferred curing agents include polyfunctional amines, e.g., aromatic diamines, or mixtures or adducts thereof, and 2,4-dialkylimidazoles. Typical amines include m-phenylene-diamine, methylenedianiline, mixtures (including adducts) of m-phenylenediamine and methylenedianiline, diaminodiphenylsulfone, 4-chlorophenylene diamine, and the like. Curring agents preferred for use in this invention include Ancamine ® amine curing agents available from Pacific Anchor Chemical Corp.

An optional third component of the tubesheet epoxy resin formulation is an epoxy curing catalyst. Any known epoxy curing catalyst which enhances the curing of a polyglycidyl ether of a polyhydric phenol with the curing agent may be used. Such catalysts are generally used in catalytic amounts, that is amounts sufficient to enhance the curing of the epoxy resin with the curing agent. Preferably, the catalyst is present in an amount of between about 0.5 and 10 parts per hundred of resin, more preferably between about 0.5 and 4 parts of catalyst per hundred parts of resin, and most preferably between about 1 and 2 parts per hundred parts of resin. Preferred catalysts include tertiary amines, for example, benzyldimethylamine, N,N,N=,N=-tetramethylbutanediamine, dimethylaminopropylamine, N-methylmorpholine, N-triethylenediamine, and the like. Generally, where the curing agent is amine based, a catalyst is not necessary.

In the embodiment wherein the device of the invention is used for membrane stripping, membrane distillation, or pervaporation, the tubesheets preferably comprise the epoxy resins hereinbefore described or polyurethanes.

The hollow fiber membrane bundle is arranged about a core; the core is arranged such that it extends through and is bonded to both the first and second tubesheets. The core functions to provide support for the two tubesheets and keeps the tubesheets from collapsing upon one another during operation. The core further functions to support the hollow fiber membrane bundle which is arranged about the core. The core may comprise a rod, a solid tube, or a perforated tube, provided the core possesses sufficient mechanical strength to support the hollow fiber membranes and the tubesheets. The core may possess a non-circular cross-section. In the embodiment where no sweep fluid is used, it is preferred that the core either be a solid tube or a solid rod.

In some embodiments, it is desirable to introduce a sweep fluid into the shellside of the hollow fiber membrane device in order to aid in the removal of permeated fluids from the vicinity of the outside of the hollow fiber membranes. One method of introducing such a sweep fluid is to equip one end of the core with a sweep inlet means, adapted for introducing a sweep fluid into the core. In this embodiment, the core is perforated in the vicinity of the hollow fiber membrane bundle such that the sweep fluid enters the hollow fiber membrane bundle. The core tube is preferably solid where it passes through the feed inlet region and non-permeate outlet region. In another preferred embodiment where a sweep fluid is used, the core is perforated at one end of the portion of the core located between the tubesheets. In one such preferred embodiment, such end of the core is adjacent to the second tubesheet, opposite the feed inlet end, which aids in promoting countercurrent flow.

The core may be made of any material which possesses sufficient mechanical strength to provide the desired support for the bundle and tubesheets. The core may be comprised of a plastic such as PVC, a composite material, or a metal. Preferably, the core is comprised of a metal, for example, aluminum or steel.

The entire membrane device is placed within a casing means. The casing means functions to protect the outside of the membrane device from damage and to contain or seal the membrane device from the outside environment. Further, the casing means is arranged about the tubesheets in such a fashion that a seal is formed between the first tubesheet and the casing means and the second tubesheet and the casing means, such that fluid cannot communicate across or through the seal. Thus the membrane device is divided into three distinct non-communicating regions: the first region being the feed inlet region, the second region being the region between the tubesheets which is outside of the hollow fiber membranes, and the third region being the non-permeate outlet region. The seal is formed by any means which provides a fluid tight seal between each of the tubesheets and the casing means. In one embodiment, the tubesheets may be bonded directly to the casing means with an adhesive material which bonds to both the tubesheet and the casing means. In a preferred embodiment, a groove is machined in each of the tubesheets about the outside circumference of said tubesheets, and an O-ring is then fit in said groove and sealed against the inside of the casing means so as to form an appropriate seal. In another preferred embodiment, the casing means contains a lip or taper, against which a gasket is optionally placed, and against which the outer circumference of the tubesheet face adjacent to the gasket seals under the influence of the hydrostatic pressure applied during operation of the device.

The casing means may comprise any material which is capable of protecting the membrane device from the environment. The casing means may, but need not be, a pressure vessel. In those embodiments wherein it is desirable to collect the permeate fluid within the casing means, the casing should be substantially to the permeate fluid. Preferably, the casing material is a plastic such PVC, a composite, or a metal. More preferably, the casing material is metal, such as aluminum or steel.

At each end of the casing means are located end capping means which are arranged for sealing the end of the casing means near the tubesheet to form regions adjacent to the opposite faces of the tubesheets which are opened to the hollow fiber membranes. The region adjacent to the outside face of the first tubesheet is the feed inlet region. The region adjacent to the outside face of the second tubesheet is the non-permeate outlet region. Such end capping means are attached to the casing means by an attachment and sealing means such that a seal is formed to prevent fluid communicating between the outside and the feed inlet region or the outside and the non-permeate outlet region. In a preferred embodiment, the end capping means is an endplate which is attached by an attachment means to the casing means. Such endplate may be attached by providing a method of bolting the endplate directly onto the casing means. The casing means may have arranged about it or bonded to it an attachment means adapted for attaching the end capping means to the end of the casing means. Each end of the casing means may have arranged around its outside a flange to which the end capping means may be fastened. In one embodiment, the flange may be formed by building up the tubesheet. In another embodiment, a separate flange may be bonded about the tubesheet, the casing means, or both the tubesheet and the casing means. In another embodiment, a slip flange may be placed about the casing means. In such an embodiment, the tubesheet is built up such that the slip flange is held on the membrane device. The end capping means is affixed to the flange which is held on the device by the built up tubesheet.

The membrane devices of this invention further comprise a feed inlet means. Generally, this is a port, nozzle, fitting, or other opening which allows introduction of the mixture of fluids to be separated into the device. In a boreside feed device, the feed inlet means is located at one end of the device such that the feed may be introduced into the bores of the hollow fiber membranes. Such feed inlet means is located in the vicinity of the opposite (outside) face of the first tubesheet. Preferably, the device is designed such that there is a region or cavity, that is, the feed inlet region, which is sealed to prevent fluid communication with the outside of the membrane device or with the region between the tubesheets which is outside the hollow fiber membranes. The inlet feed region is defined by the first tubesheet, the first end capping means, and the casing means. Such feed inlet region functions as a pressure vessel. The feed inlet means introduces the feed fluid mixture into such region. Such region communicates with one end of the hollow fiber membranes, thus allowing the feed fluid mixture to be separated to flow into and down the bores of the hollow fiber membranes. The feed inlet means may be located in the first end capping means.

The non-permeate outlet means is adapted for removing the fluids which do not permeate through the hollow fiber membranes from the membrane device. The fluids which do not permeate through the membranes exit the bores of the hollow fiber membranes at the end opposite that end to which the feed fluid mixture is introduced. Preferably, the exiting fluids enter a non-permeate outlet region. Such region is adjacent to the opposite (outside) face of the second tubesheet and is sealed such that fluid cannot communicate with the outside of the membrane device or with the region between the tubesheets which is outside the hollow fiber membranes. This region is generally a cavity defined by the second tubesheet, the casing means, and the second end capping means. The non-permeate outlet means generally is a port, nozzle, fitting, or other opening which allows removal of the non-permeate from the device. The non-permeate outlet means may be located in the second end capping means.

The permeate outlet means for removing the fluids which permeate through the hollow fiber membranes from the region between the two tubesheets which is outside of the hollow fiber membranes is a port, nozzle, fitting, or other opening adapted for withdrawing the permeate from the shellside of the membrane device. In one embodiment, it is preferable that the permeate outlet means be located near the end of the membrane device to which the feed fluid mixture is introduced. Such location of the permeate outlet means results in countercurrent flow of the feed fluid mixture with relationship to the flow of the permeate fluid, which enhances the concentration gradient along the hollow fiber membranes, thereby improving the recovery and productivity of the membrane device.

The membrane devices of this invention contain means for channeling flow: such means for channeling flow are arranged to channel flow of permeate in a longitudinal direction parallel to the core towards the permeate outlet means. The means for channeling flow thus function to encourage countercurrent flow of the feed fluid mixture to be separated down the bores of the hollow fibers with relation to the flow of the permeate fluid and the sweep fluid, if any.

The membrane device of this invention may contain one or more means for channeling flow of permeate. Preferably, one means for channeling flow encircles the exterior of the hollow fiber bundle and has its first end attached to, or embedded in, the second tubesheet such that the permeate fluid cannot exit the device near the second tubesheet: the second end of said exterior means for channeling flow is located a distance from the first tubesheet, wherein the distance between the second end of the means for channeling flow and the first tubesheet is sufficient to allow the permeate fluid and sweep fluid, if any, to flow to the permeate outlet means wherein such flow occurs near the first tubesheet.

In another embodiment, one means of channeling flow may be embedded in both tubesheets. In such an embodiment, some means of allowing the flow of permeate fluid from the outside of the hollow fiber bundle to exit the device via the permeate outlet means is incorporated in the means for channeling flow. Preferably the means for allowing the flow of fluid to the permeate outlet means in such an embodiment are holes or perforations in the flow channeling means. Such holes or perforations are located near the end embedded in the first tubesheet.

One or more means for channeling flow may be located within the interior of the hollow fiber bundle. The first end of such interior means for channeling flow is located near the second tubesheet such that the distance between the second tubesheet and the interior means of channeling flow is sufficient to allow the permeate fluid and sweep fluid, if any, to flow into the flow channels created by the interior means for channeling flow. The second end of such interior means for channeling flow is located near the first tubesheet wherein the distance between the second end and the first tubesheet is sufficient to allow the permeate stream and sweep fluid, if any, to flow to the permeate outlet means. Such interior means of channeling flow function to maintain countercurrent flow throughout the device and to control permeate concentration within the device. In the embodiment where no sweep fluid is used, such interior means for channeling flow preferably have a first end embedded in the second tubesheet and the second end located at a distance from the first tubesheet, said distance between the end of the interior means for channeling the flow and the first tubesheet being sufficient to allow the permeate fluid flowing along the interior means for channeling flow to flow to the permeate outlet means. Such interior means for channeling flow functions to force the permeate fluid to flow in a direction countercurrent to the direction that the feed fluid mixture is flowing down the bore of the hollow fiber membranes. Such countercurrent flow results in reducing the concentration of the permeate fluid in the region nearest the second tubesheet, thus maximizing the concentration gradient across a major portion of the length of the membrane device.

In the embodiment wherein a sweep fluid is introduced into the hollow fiber bundle via the core, it is preferable to have at least two means for channeling flow of permeate.

The actual distance between the end of the means for channeling flow and the first tubesheet is not critical, provided sufficient space is provided between the end of the means for channeling flow and the tubesheets to allow the permeating gas to be withdrawn by the permeate outlet means. This results in an improved recovery and productivity for the device.

The means for channeling flow may, in one preferred embodiment, comprise a series of substantially impermeable baffles or wraps. Such baffles are preferably comprised of flexible materials which are substantially impermeable to the fluids being separated. Examples of suitable impermeable baffle materials are MYLAR polyester film available from ICI and SARAN polyvinylidene chloride plastic film available from the Dow Chemical Company. Such baffles may be arranged as concentric tubes parallel to the core. Optionally, such baffles may be formed in a spiral fashion beginning at the core and ending near or at the outside of the bundle. The number of baffles which may be present is that number which provides sufficient channeling of the permeate fluid to maintain a substantially countercurrent flow. The number of baffles used will therefore depend upon the bundle diameter, the packing factor of the hollow fiber membranes in the bundle, and the bundle length. In one preferred embodiment, baffles are preferably placed in intervals measured along the bundle diameter from the core of between about $\frac{1}{4}$ to about 2 inches, more preferably about $\frac{3}{4}$ to about $1\frac{1}{2}$ inches, even more preferably about $\frac{3}{4}$ to $1\frac{1}{4}$. The baffle length should be sufficient to promote countercurrent flow along a major portion of the length of the hollow fiber membranes. The baffles preferably extend along the length of the bundle between the tubesheets between about 50 and about 95 percent, more preferably between about 75 and about 95 percent, even more preferably between about 80 and about 90 percent.

Optionally, the device may contain a separate tubesheet support means comprising a means which functions to support the outer edge of the tubesheets and to prevent or reduce stresses due to bending and compression as a result of pressurizing the outside of the tubesheets. The tubesheet support means is preferably a cylinder which surrounds the outer portion of the hollow fiber bundle and is bonded about the tubesheet with a resin. Any resin which adheres the tubesheet to the tubesheet support and has sufficient modulus to maintain the bond under normal operating conditions is useful for forming such a bond. Included in the resins which may be used to form such a bond are the resins which may be used to form the tubesheets. The support means may surround a portion of the tubesheet and be bonded thereto or the support means may be embedded in a tubesheet which is built up around the support means. The tubesheet support means may be made of any material which provides sufficient support to prevent or reduce the compression stresses and bending stresses on the tubesheet and to prevent the tubesheets from collapsing in on one another. Such materials include high strength plastics such as PVC, composites, and metals; metals are preferred. Examples of metals which may be used include aluminum or steel. The tubesheet support means contains one or more ports or openings so as to allow the permeate fluid to leave the membrane device.

Optionally, a material which functions to insulate the membrane device and/or absorb shock may be placed within the casing means on the outside of the hollow fiber bundle in the region between the two tubesheets. Such a material includes polyurethane foam and tightly packed foam beads. The material generally covers a portion of the outside of the hollow fiber membrane bundle, said portion extending from the second tubesheet along the length of the hollow fiber membrane bundle towards the first tubesheet and ending short of the first tubesheet such that a sufficient opening exists to allow the permeate fluid and sweep fluid, if any, to flow through the opening to the permeate outlet means. In a preferred embodiment, the insulating and/or shock absorbing material also functions as the exterior means for channeling flow.

The hollow fiber membrane devices of this invention may be constructed using processes well known in the art. Generally, in hollow fiber membrane device construction, the hollow fiber membranes are formed into a bundle with a suitable shape for device construction. Preferred bundle arrangements include parallel laying down of fibers or bias wrap laying down of fibers. The tubesheets may be formed about the ends of the bundle simultaneously with laying down of the fibers, such as by dripping resin along the fibers as the fibers are laid down. Alternatively, the bundle may be formed and then the tubesheets may be formed about each end of the bundle by centrifugal casting or dunk potting techniques, as well known in the art. In those embodiments where it is desirable to build up the tubesheets to a circumference larger than the circumference of the hollow fiber bundle, the following procedure may be used. Where the tubesheets are formed after the formation of the bundle, the casting or potting technique involves using appropriate molds to form larger circumference tubesheets. In the embodiment where the tubesheet is formed as the fibers are being laid down, once all the fibers have been laid down, the tubesheets may be built up by a variety of methods. One such method is to continue to wrap resin and impregnated cloth around the end of the tubesheets or circumference of the tubesheets and provide further resin so that the tubesheets are built up: thereafter, the resin is cured.

The baffles are introduced into the hollow fiber bundle during fabrication of the bundle. If the baffles are placed in spiral or jelly roll configuration, the baffles are placed around the fibers as the fibers are laid down. Alternatively, if the baffles are of a concentric cylinder arrangement, then after a portion of the fibers are laid down, a baffle is placed over the fibers, and further fiber layers are laid down until the next baffle is placed over the fibers: this procedure is continued until the device is completed.

Once the hollow fiber bundle, tubesheets, and baffles have been assembled, then the optional tubesheet support means is placed about the outside of the hollow fiber bundle and either bound to the tubesheet using a resin, or the tubesheet is built up around the end of the tubesheet support means. In one embodiment where the tubesheet support means is bonded to the tubesheet, the following procedure is used. With the tubesheet support means on end, the tubesheets and hollow fiber bundle is inserted into the tubesheet support means, caulking is packed into the space between the tubesheet support means and the tubesheet at a depth of about three to four inches. A fast setting resin is used to wet the caulking, forming a sealed annular groove. Thereafter, bonding resin is poured into the groove bonding the tubesheet to the groove. After the resin is cured, the device is rotated end for end and the other tubesheet is bonded in the same fashion. Other methods of bonding may be used.

The tubesheets may be potted and placed inside of the tubesheet support means, forming the tubesheet and the bond between the tubesheet and the tubesheet support means in a single step. Once the tubesheet support means is bonded to the tubesheet, then an attachment means is bonded to the tubesheet support means, the tubesheet, or both, which is adapted for attaching the end capping means thereto. In one embodiment, a flange is welded to the tubesheet support means or bonded to the tubesheet via a resin, or both. Thereafter, the end capping means are attached to such a flange. Where necessary, gaskets are placed between the flange about the tubesheet and the end capping means so as to insure a fluid tight seal. Alternatively, slip flanges may be used as described hereinbefore.

The hollow fiber bundle, with tubesheets and core, is inserted into the casing. Thereafter, the end capping means are attached to the ends of the casing. Note that prior to inserting the hollow fiber bundle with tubesheets and core into the casing, the faces of the tubesheets opposite the hollow fiber bundle are machined or otherwise treated so as to open the ends of the hollow fiber membranes so as to allow introduction of fluid into and withdrawal of fluid from such hollow fiber membranes.

In the embodiment wherein a sweep fluid is used, the sweep fluid may be any fluid which aids in the removal of the permeate fluid from the shellside of the membrane device. The sweep fluid may be a liquid, vapor, or gas. In a gas separation or membrane stripping separation, the sweep fluid is preferably a gas. Preferred sweep gases include air, nitrogen, and the like.

The following descriptions of preferred embodiments as illustrated by the figures is provided to further illustrate the invention. FIG. 1 demonstrates a hollow fiber membrane device of the invention wherein the entire device is housed within a casing. The device comprises a bundle of hollow fibers (10) (the hollow fibers are not shown for simplicity). Interspersed in such a bundle of hollow fibers (10) is a series of baffles (11), which comprise a series of hollow cylinders interspersed among the hollow fiber bundle (10) and which are arranged in a parallel fashion to the core tube (12) and the tubesheet support means (13). The core tube (12) extends through the first tubesheet (14) and the second tubesheet (15) and is bonded thereto. Further, the hollow fiber bundle

(10) is arranged about and supported by said core tube (12). Arranged about the hollow fiber bundle (10) is the tubesheet support means (13) which is further bonded to each of the tubesheets (14) and (15). The tubesheet support means (13) is arranged to support the tubesheets (14) and (15). Encircling the entire hollow fiber bundle (10) and tubesheets (14 and 15) is a case (16). At the end of the case nearest the first tubesheet (14) is a first endplate (17), such endplate is adapted (17) for sealing one end of the case (16). In the vicinity of the second tubesheet (15) at the end of the case (16) is a second endplate (18), said endplate (18) is adapted to seal the second end of the case (16). Seated in a groove in the first tubesheet (14) is an O-ring (19) which is adapted to form a seal between the first tubesheet (14) and the case (16). Seated in a groove in the second tubesheet (15) is a second O-ring (20) which is adapted for forming a seal between the second tubesheet (15) and the case (16). In the first endplate (17) is found a feed inlet port (21), which is adapted for introducing into the device a mixture of fluids to be separated. In the second endplate (18) is found a non-permeate outlet port (22), said outlet port designed to withdraw those fluids which do not permeate across the hollow fiber membranes from the device. In the case (16) near the first tubesheet (14) is located a permeate outlet port (23), which is adapted for withdrawing the permeate fluid from the device. Further illustrated are four bolts (24) which are adapted for securing the first endplate (17) and the second endplate (18) to the case (16). The tubesheet support means (13) further contains ports or holes (25) in the end near the permeate outlet port (23), such ports or holes being designed to allow the flow of permeate fluid through the tubesheet support means (13) to the permeate withdrawal port (23). The first tubesheet (14), first endplate (17), and case (16) form a feed inlet region (26), which is the region into which the feed fluid mixture is introduced and which is adjacent to the face of the first tubesheet (14) to which the one end of the hollow fiber bundle (10) is open. Such feed inlet region is adapted to allow the flow of the feed fluid mixture into the bores of the hollow fibers of the bundle (10). A non-permeate outlet region (27) is defined by the outside face of the second tubesheet (15), the second endplate (18), and the case (16). This region (27) functions as the region where the non-permeating fluids which exit the hollow fibers flows into and from which the non-permeating fluids are withdrawn through the non-permeate outlet port (22). The case (16) and tubesheet support means (13) are arranged to define a flow space (37) into which the fluid permeating through the hollow fibers flows by ports or holes (25) in the tubesheet support means (13). The permeate fluid is removed from the flow space (37) via the permeate outlet port (23).

Another embodiment of the present invention is illustrated by FIG. 2. In this embodiment, the tubesheet support means also functions as a casing about the hollow fiber membrane bundle. The device comprises a hollow fiber membrane bundle (10) (the hollow fibers are not shown for simplicity) which is arranged about a core (12). The core (12) extends through and is bonded to a first tubesheet (14) and a second tubesheet (15) at either end of the hollow fiber membrane bundle (10). The device further comprises a series of baffles (11) wherein one end of each of the baffles (11) is embedded in the second tubesheet (15) and the second end of each of the baffles (11) is in the vicinity of the first tubesheet (14) with sufficient distance between said first tubesheet (14) and the baffles (11) to allow the permeate fluid to be withdrawn from the device. Arranged about the tubesheets (14) and (15) and the hollow fiber membrane bundle (10) is a tubesheet support means (13) which is bonded to each tubesheet (14) and (15) by resin bonds. Welded to each end of the tubesheet support means (13) are flanges (29) and (30). The flanges (29) and (30) are adapted for fixing the first endplate (17) to the end of the device near the first tubesheet (14), and the second endplate (18) near the end of the device near the second tubesheet (15). In the first endplate (17) is a feed inlet port (21) adapted for introducing a mixture of fluids to be separated into the device. The feed fluid mixture is introduced into a feed inlet region (26), said region (26) being a cavity surrounded on one side by the outside face of the first tubesheet (14) and on the second side by the first endplate (17). Gaskets (35 and 36) between the flanges (29 and 30) and the first and second endplates (17 and 18), respectively, are shown. The feed inlet region (26) is sealed from the outside such that fluid cannot communicate into said region (26) other than through the feed inlet port (21). In the second endplate (18) is a non-permeate outlet port (22). This non-permeate outlet port (22) communicates with the non-permeate outlet region (27), said region (27) being defined by the outside surface of the second tubesheet (15) and the second endplate (18). This region is sealed from the outside such that fluid can only communicate into and out of the region (27) via the hollow fibers of the bundle (10) and the non-permeate outlet port (22). Attached to the tubesheet support means (13) at the end of the said tubesheet support means (13) near the first tubesheet (14) is a permeate outlet port (23). This permeate outlet port (23) is used to withdraw the fluids which permeate across the membranes into the shellside of the device. The endplates (17) and (18) are attached to the flanges (29 and 30) via bolts (24).

Another embodiment of the invention is illustrated by FIG. 3. This embodiment illustrates a device which is adapted for the use of a sweep fluid. The device comprises a hollow fiber membrane bundle (10) (the hollow fibers are now shown for simplicity) which is arranged about a core (12). The core (12) extends through and is bonded to a first tubesheet (14) and a second tubesheet (15) at either end of the hollow fiber membrane bundle (10). The core (12) at a first end has a sweep fluid inlet port (31) adapted for introducing a sweep fluid into the hollow fiber bundle (10) via perforations in the core (32). The core (12) is plugged by a plug (36a) at its second end, thereby forcing all the sweep fluid into the hollow fiber membrane bundle (10). The device further comprises a series of baffles (11) wherein one end of each of the baffles (11) is in the vicinity of the second tubesheet (15) with sufficient distance between the second tubesheet (15) and first end of the baffles (11) to allow the sweep fluid to flow from the core (12) to the flow channels formed by the baffles (11). The second end of each of the baffles (11) is in the vicinity of the first tubesheet (14) with sufficient distance between said first tubesheet (14) and the baffles (11) to allow the sweep fluid and permeate fluid to flow to the permeate outlet port (23). The bundle (10) is surrounded by an external baffle (33). This baffle is embedded in the tubesheets (14 and 15) at both ends. Located in the end of the external baffle (33) nearest the first tubesheet (15) is a series of holes (34) adapted for allowing the permeate fluid and sweep fluid to flow to the permeate outlet port. Holes in the baffles (33) allow the permeate fluid and sweep fluid to be withdrawn from the device. The tubesheet support means (13) and external baffle (33) are arranged to allow a flow space (37) between them adapted to allow the fluid flowing out of the holes (34) in the external baffle (33) to flow to the permeate outlet port (23). Arranged about the tubesheets (14) and (15) and the hollow fiber membrane bundle (10) is a tubesheet support means (13) which is embedded in each tubesheet (14) and (15). About each end of the tubesheet support means (13) are slip flanges (29) and (30) such flanges are located inside the built up tubesheets (14) and (15). The flanges (29) and (30) are adapted for fixing the first endplate (17) to the end of the device near the first tubesheet (14), and the second endplate (18) near the end of the device near the second tubesheet (15). In the first endplate (17) is a feed inlet port (21) adapted for introducing a mixture of fluids to be separated to the device. The feed fluid mixture is introduced into a feed inlet region (26), said region (26) is a cavity surrounded on one side by the opposite face of the first tubesheet (14) and on the second side by the first endplate (17). The feed inlet region (26) is sealed from the outside such that fluid cannot communicate into said region (26) other than through the feed inlet port (21). In the second endplate (18) is a non-permeate outlet port (22). This non-permeate outlet port (22) communicates with the non-permeate outlet region (27), said region (27) being defined by the outside surface of the second tubesheet (15) and the second endplate (18). This region (27) is sealed from the outside such that fluid can only communicate into and out of the region via the hollow fibers of the bundle (10) and the non-permeate outlet port (22). Gaskets (35) and (36) are provided between the tubesheets (14) and (15) and the first and second endplates (17) and (18) respectively. Attached to the tubesheet support means (13) is a permeate outlet port (23). This permeate outlet port (23) is used to withdraw the fluids which permeate across the membranes into the shellside of the device. The endplates (17) and (18) are attached to the flanges (29) and (30) via bolts (24).

FIG. 4 demonstrates a cross-sectional view of the membrane device shown in FIG. 1. A bundle of hollow fibers (10) (the hollow fibers are not shown for simplicity) arranged about a core (12), with a series of baffles (11) is arranged in concentric fashion through the bundle (10). About the bundle (10) is the tubesheet support means (13). Further arranged about the tubesheet support means is the case (16). The drawing further illustrates the holes (25) in the tubesheet support means (13) adapted for allowing the fluid to exit the area around the bundle and to enter the flow space (37) between the tubesheet support means (13) and the case (16). The fluid in the flow space (37) is removed via the permeate outlet means (23).

FIG. 5 demonstrates a cross-sectional view of a membrane device similar to the one depicted by FIG. 2. In this view, the hollow fiber bundle (10) (the hollow fibers are not shown for simplicity) arranged about the core (12) has interspersed through it a baffle (11) arranged in a spiral fashion. Arranged about the bundle (10) is the tubesheet support means (13). Also illustrated is one flange (30) and four bolts (24) adapted for attaching the end cap to the device by the flange (30). The fluid permeating through the hollow fiber membranes is removed via the permeate outlet port (23).

FIG. 6 illustrates a preferred embodiment of the invention which possesses alternate end capping means. Only one end of the device is shown. A bundle of hollow fibers (10) (the hollow fibers are not shown for simplicity) is arranged about a core tube (12) with end plug (38). Interspersed in such bundle of hollow fibers (10) are baffles (11). The core tube (12) extends through the tubesheet (14) and is bonded thereto. The hollow fiber bundle (10), tubesheet (14), and core tube (12) are enclosed within a case (16). An endplate (17) is adapted for sealing one end of the case (16) to a flange (29) by means of bolts (24) and gaskets (35). The inside surface of the case (16) and flange (29) is sprayed with mold release prior to filling region with resin to form a resin plug (40). The resin is sealed via a gasket (41) placed against a lip (42) located on the inside surface of the case (16) to prevent bonding of said resin to said inside surfaces of the case (16) and flange (29). An O-ring (19) provides sealing means between the inside surface of the case (16) and tubesheet (14). The endplate (17) contains a feed inlet port (21) and the case (16) contains a permeate outlet port (23).

FIG. 7 illustrates a preferred embodiment of the invention which possesses alternate end capping means. Only one end of the device is shown. A bundle of hollow fibers (10) is arranged about a core tube (12) with end plug (38). Interspersed in such bundle of hollow fibers (10) are baffles (11). The core tube (12) extends through the tubesheet (14) and is bonded thereto. The hollow fiber bundle (10), tubesheet (14) and core tube (12) are enclosed within a case (16). An end cap (43) is adapted for sealing one end of the case (16) to the end cap (43). The region formed by the inside surface of the case (16) and the tubesheet (14) is filled with resin after spraying the inside surface of the case (16) with mold release to prevent bonding of such resin to the inside surface of the case (16) thus forming a resin plug (40). The resin plug (40) is sealed via a gasket (41) placed against a lip (42) located on the inside surface of the case (16). An O-ring (19) provides sealing means between the inside surface of the case (16) and the tubesheet (14). The end cap (43) contains a feed inlet port (21) and the case (16) contains a permeate outlet port (23).

In many of these separations, the force which drives the selectively permeating fluids across and through the membrane is a pressure or chemical differential between the feed side of the membrane and the permeate side of the membrane. Feed side of the membrane refers herein to that side of the membrane to which the feed fluid mixture is contacted. Permeate side of the membrane is that side of the membrane to which the fluids selectively permeate and on which the stream richer in the preferentially permeating fluids can be found. Preferably, in the separation of oxygen from nitrogen, the pressure differential is between about 90 psi. (620 kPa) and about 250 psi. (1720 kPa). In the separation of nitrogen or carbon dioxide from light hydrocarbons or natural gas, the pressure differential across the membrane is preferably between about 280 psi. (1930 kPa) and about 900 psi. (6200 kPa). In the embodiment wherein oxygen is separated from nitrogen, the separation preferably takes place at temperatures of between about 0° and about 100° C., more preferably between about 0° C. and 50° C. In that embodiment where nitrogen or carbon dioxide is separated from light hydrocarbons or natural gas, the separation preferably takes place at temperatures between about −10° C. and about 120° C.

In membrane stripping, membrane distillation, and pervaporation operations, the temperatures are preferably between about 10° C. and 95° C. and the pressure gradient across the membrane is preferably between about 0 psi. to 60 psi. In some applications, it is preferable to use a sweep fluid, preferably sweep gas, on the shellside of the membrane device.

Operation of the membrane device can be illustrated by reference to FIG. 2. A mixture of fluids to be separated is introduced via the feed inlet port (21) into the feed inlet region (26) under pressure. The fluids to be separated thus flow down the bores of the hollow fiber membranes in the hollow fiber bundle (10). A portion of the feed fluid mixture permeates across the membranes into the shellside of the membrane device. The baffles (11) force the permeate fluid to flow countercurrent to the feed fluid flow direction. The fluid which does not permeate exits the hollow fibers of the bundle (10) into the permeate outlet region (27) and is removed from the device through the non-permeate outlet port (23). The permeate is removed from the shellside of the device through the permeate fluid outlet port (27).

What is claimed is:

1. A hollow fiber membrane fluid separation device adapted for boreside feed comprising:
   A. a plurality of hollow fiber membranes, wherein the hollow fiber membranes are arranged in a bundle and are adapted for the separation of one or more fluids from one or more other fluids in a feed fluid mixture;
   B. a first tubesheet comprised of a thermoset or thermoplastic polymeric material located at the first end of the bundle, arranged such that the hollow fiber membranes are embedded in the first tubesheet and communicate through the first tubesheet and are open on the opposite face of the first tubesheet;
   C. a second tubesheet comprised of a thermoset or thermoplastic polymeric material located at the second end of the bundle opposite the first end of the bundle, arranged such that the hollow fiber membranes are embedded in the second tubesheet and communicate through the second tubesheet and are open on the opposite face of the second tubesheet;
   D. a core about which is arranged the hollow fiber membrane bundle, further arranged such that the core extends through and is bonded to the first tubesheet and the second tubesheet;
   E. a casing means encasing the hollow fiber membrane bundle, the first and second tubesheets, and the core;
   F. a first end capping means arranged and adapted for sealing the first end of the casing means at the end of the casing means near the first tubesheet;
   G. a first attachment means arranged for attaching the first end capping means to the first end of the casing means;
   H. a feed inlet means adapted for introducing the feed fluid mixture to be separated into the bores of the hollow fiber membranes by contacting the feed fluid mixture with the open hollow fiber membranes at the opposite face of the first tubesheet;
   I. a feed inlet region defined by the first end capping means and the casing means located adjacent to the opposite face of the first tubesheet, wherein the feed inlet region is sealed such that fluid can only enter or leave the feed inlet region through the feed inlet means or the hollow fiber membranes, and the feed inlet region is arranged to introduce the feed fluid mixture into the bores of the hollow fiber membranes;
   J. a first means for forming a seal between the first tubesheet means and the casing means such that fluid cannot communicate between the feed inlet region and the region between the two tubesheets which is outside of the hollow fiber membranes;
   K. a second end capping means arranged and adapted for sealing the second end of the casing means at the end of the casing means near the second tubesheet;
   L. a second attachment means arranged for attaching the second end capping means to the second end of the casing means;
   M. a non-permeate outlet means adapted for removing fluid which does not permeate through the hollow fiber membranes from the bores of the hollow fiber membranes at the opposite face of the second tubesheet;
   N. a non-permeate outlet region defined by the second end capping means and the casing means located adjacent to the opposite face of the second tubesheet, wherein the non-permeate outlet region is sealed such that fluid which does not permeate the hollow fiber membranes can only enter or leave the non-permeate outlet region through the hollow fiber membranes or the non-permeate outlet means and the non-permeate outlet region is arranged to remove the fluid which does not permeate the hollow fiber membranes from the bores of the hollow fiber membranes;
   O. a second means for forming a seal between the second tubesheet means and the casing means such that fluid cannot communicate between the non-permeate outlet region and the region between the two tubesheets which is outside of the hollow fiber membranes;
   P. a permeate outlet means for removing fluid which permeates through the hollow fiber membranes from the region between the two tubesheets which is outside of the hollow fiber membranes; and
   Q. one or more means for channeling flow of fluid which permeates through the hollow fiber membranes to the region between the two tubesheets which is outside of the hollow fiber membranes, such means for channeling flow arranged to channel flow of fluid which permeates through the hollow fiber membranes in the longitudinal direction parallel to the core toward the permeate outlet means, wherein the means for channeling flow have one end embedded in or attached to the second tubesheet and the second end located at a distance from the first tubesheet, said distance between the second end of the means for channeling flow and the first tubesheet being sufficient to allow the fluid which permeates through the hollow fiber membranes and flows along the means for channeling flow to flow to the permeate outlet means.

2. The device of claim 1 which further comprises:
   R. a means for introducing a sweep fluid into the core, wherein the core is adapted to introduce the sweep fluid into the portion of the device between the first and second tubesheets which is outside of the hollow fiber membranes.

3. The device of claim 2 wherein an exterior means of channeling flow encircles the exterior of the hollow fiber bundle, wherein the first end of said exterior means for channeling flow is attached to or embedded in the second tubesheet, and the second end of said exterior means for channeling flow is located a distance from the first tubesheet, wherein the distance between the second end of said exterior means for channeling flow and the first tubesheet is sufficient to allow the permeate fluid and sweep fluid to flow to the permeate outlet means: and the device has at least one interior means for channeling flow in the interior of the hollow fiber bundle, wherein the first end of such interior means for channeling flow is located near the second tubesheet, wherein the distance between the second tubesheet and the interior means for channeling flow is sufficient to allow the sweep fluid to flow into flow channels created by the interior means for channeling flow, and the second end of the interior means for channeling flow is located near the first tubesheet, wherein the distance between the second end of the interior means for channeling flow and the first tubesheet is sufficient to allow the permeate fluid and sweep fluid to flow to the permeate outlet means.

4. The device of claim 1 wherein an exterior means of channeling flow encircles the exterior of the hollow fiber membrane bundle, wherein the first end of said exterior means for channeling flow is attached to or embedded in the second tubesheet, and the second end of said exterior means for channeling flow is located a distance from the first tubesheet, wherein the distance between the second end of said exterior means for channeling flow and the first tubesheet is sufficient to allow the permeate fluid to flow to the permeate outlet means; and the device has at least one interior means for channeling flow in the interior of the hollow fiber membrane bundle, wherein the first end of such interior means for channeling flow is located near the second tubesheet, wherein the distance between the second tubesheet and the interior means for channeling flow is sufficient to allow the permeate fluid to flow into flow channels created by the interior means for channeling flow, and the second end of the interior means for channeling flow is located near the first tubesheet, wherein the distance between the second end of the interior means for and the first tubesheet is sufficient to allow the permeate fluid to flow to the permeate outlet means.

5. The device of claims 3 or 4 wherein the hollow fiber membranes have a dense discriminating region which separates one or more fluids from one or more other fluids.

6. The device of claim 5 wherein the feed fluid mixture to be separated comprises a mixture of two or more gases.

7. The device of claim 6 wherein the feed gas mixture to be separated comprises one or more gases selected from the group consisting of hydrogen, helium, oxygen, nitrogen, carbon monoxide, carbon dioxide, hydrogen sulfide, ammonia, and light hydrocarbons.

8. The device of claim 7 wherein the feed gas mixture to be separated comprises oxygen and nitrogen.

9. The device of claim 7 wherein the feed gas mixture to be separated comprises hydrogen and at least one light hydrocarbon.

10. The device of claim 6 wherein the hollow fiber membranes are comprised of at least one polymeric material selected from the group consisting of polysulfone, polyethersulfone, polyimide, polyestercarbonate, and polycarbonate.

11. The device of claim 10 wherein the hollow fiber membranes are comprised of at least one polymeric material selected from the group consisting of polyestercarbonate and polycarbonate.

12. The device of claims 3 and 4 wherein the feed fluid mixture to be separated comprises a mixture of two or more liquids.

13. The device of claim 12 wherein the fluid permeates through or across the membrane as a gas or vapor which is removed from the device as a gas or vapor.

14. The device of claim 13 wherein the membranes are microporous.

15. The device of claim 14 wherein the membranes are comprised of at least one polymeric material selected from the group consisting of polyolefins, fluorinated polyolefins, polystyrene, polyetherketone, and polyetheretherketone.

16. The device of claim 15 wherein the membranes are comprised of at least one polyolefin selected from the group consisting of polyethylene, polypropylene, and poly-4-methylpentene.

17. The device of claim 14 wherein the feed liquid mixture to be separated comprises one or more liquids selected from the group consisting of $C_{1-10}$ aliphatic and aromatic halogenated hydrocarbons, $C_{1-10}$ aliphatic and aromatic hydrocarbons, $C_{1-10}$ aliphatic and aromatic alcohols, $C_{1-8}$ ethers, and $C_{1-8}$ amines.

18. The device of claims 3 or 4 wherein the means for channeling flow comprise impermeable baffles which extend about 50 to about 95 percent of the bundle length between the two tubesheets.

19. The device of claim 18 which contains baffles placed in intervals along the bundle diameter from the core of between about ¼ to about 2 inches.

20. The device of claim 19 wherein the hollow fiber membrane bundle is bias wrapped.

21. The device of claim 19 wherein the hollow fiber membrane bundle is parallel wrapped.

22. The device of claim 19 which additionally comprises an insulating and/or shock absorbing material which covers a portion of the outside of the hollow fiber membrane bundle, said portion extending from the second tubesheet along the length of the hollow fiber membrane bundle towards the first tubesheet and ending short of the first tubesheet such that a sufficient opening exists to allow the permeate fluid and sweep fluid, if any, to flow through the opening to the permeate outlet means.

23. The device of claim 22 wherein the insulating and/or shock absorbing material also functions as the exterior means for channeling flow.

24. The device of claim 19 wherein the casing means comprises a pressure vessel.

* * * * *

UNITED STATES PATENT AND TRADEMARK OFFICE
CERTIFICATE OF CORRECTION

PATENT NO. : 4,961,760

DATED : October 9, 1990

INVENTOR(S) : Terrence L. Caskey

It is certified that error appears in the above-identified patent and that said Letters Patent is hereby corrected as shown below:

Col. 1, line 10, delete "4,929,759" and insert -- 4,929,259 --;

Col. 7, line 59, delete "4,4=" and insert -- 4,4' --;

Col. 7, line 62, delete "4,4=" and insert -- 4,4' --;

Col. 8, line 47, delete "N,N,N=,N=" and insert -- N,N,N',N' --;

UNITED STATES PATENT AND TRADEMARK OFFICE
CERTIFICATE OF CORRECTION

PATENT NO. : 4,961,760

DATED : October 9, 1990

INVENTOR(S) : Terrence L. Caskey

It is certified that error appears in the above-identified patent and that said Letters Patent is hereby corrected as shown below:

Col. 12, line 62, after "outside" insert -- faces --;

Col. 16, line 42, delete "now" and insert -- not --.

Signed and Sealed this

Twenty-sixth Day of May, 1992

Attest:

DOUGLAS B. COMER

Attesting Officer

Acting Commissioner of Patents and Trademarks